April 28, 1970     E. R. CUNNINGHAM     3,508,458

ROTARY CUTTER WITH HOLD DOWN MEANS

Filed Dec. 8, 1967     2 Sheets-Sheet 1

INVENTOR.
Ernest R. Cunningham
BY
His Att'ys

April 28, 1970  E. R. CUNNINGHAM  3,508,458
ROTARY CUTTER WITH HOLD DOWN MEANS
Filed Dec. 8, 1967  2 Sheets-Sheet 2
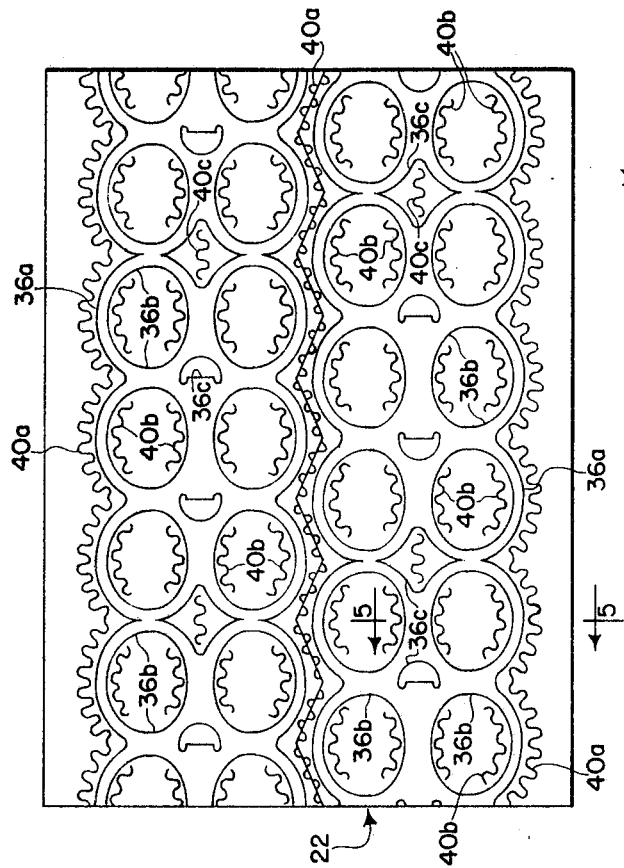
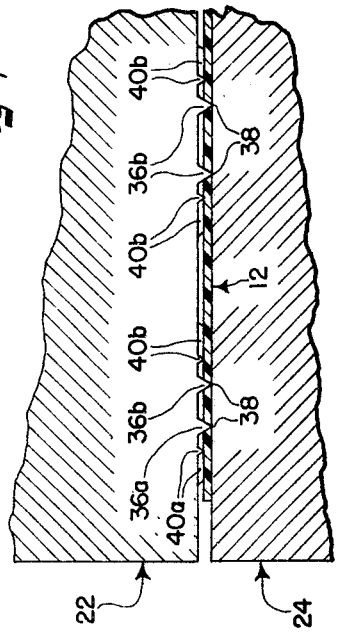
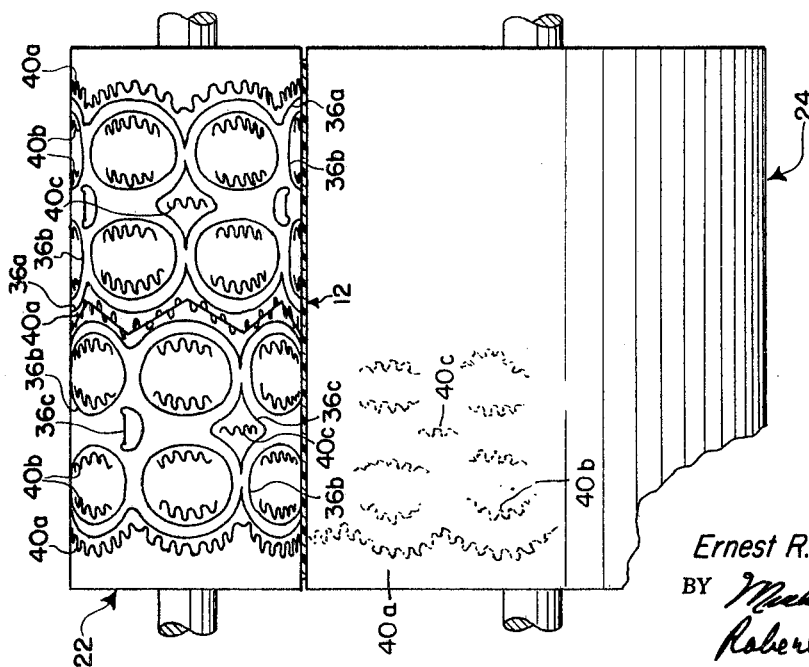
INVENTOR.
Ernest R. Cunningham
BY
His Att'ys United States Patent Office 3,508,458
Patented Apr. 28, 1970

3,508,458
ROTARY CUTTER WITH HOLD DOWN MEANS
Ernest R. Cunningham, Libertyville, Ill., assignor to Illinois Tool Works Inc., Chicago, Ill., a corporation of Delaware
Filed Dec. 8, 1967, Ser. No. 689,137
Int. Cl. B26d 3/08, 7/02; B26f 1/42
U.S. Cl. 83—9                                      8 Claims

ABSTRACT OF THE DISCLOSURE

A rotary cutter for sheet material having a low coefficient of friction including a cutting roll and a back-up roll wherein one of said cutting roll and back-up roll is provided with means which restricts transverse and longitudinal movement of the sheet material as it is acted upon by the cutting roll.

---

The present invention relates to a rotary cutting machine which is particularly efficacious for sheet material, such as strip polyethylene or the like, having a low coefficient of friction. The problem that has been encountered with such sheet material is one of cutting edge bite, that is, there is a tendency for the cutting roll to spin as it acts upon the sheet material which has the effect of distorting the configuration which is cut from the sheet material in an unpredictable manner. This, of course, is undesirable where it is necessary to produce cut products having precise angular and linear dimensions for a particular design. As a result, rotary cutting techniques, although offering greater speed than conventional trim presses, have not generally been utilized where cutting of sheet material having a low coefficient of friction is to be performed.

It is one object of the present invention to provide an improved rotary cutting technique and apparatus for sheet material, particularly though not exclusively, adapted for use with sheet material having a low coefficient of friction such as strip plastic material.

Another object of the present invention is the provision of a rotary cutting technique and apparatus for sheet material wheerin the sheet material is prevented from slipping or sliding as it acted upon by cutting means.

A further object of the present invention is the provision of a rotary cutting technique and apparatus of the aforementioned type which is capable of high speed and sustained manufacture of precisely dimensioned products having many unusual configurations.

These and other objects and advantages of the present invention are attained by the provision of a rotary cutter which includes a cutting roll and a back-up roll, the cutting roll having cutting rules protruding therefrom which are arranged in a predetermined configuration for cooperation with the back-up roll in cutting sheet material in conformity with the predetermined configuration of the cutting rules, and hold-down means associated with said cutting roll and back-up roll for impressing a score pattern in the sheet material of a type which restricts transverse and longitudinal movement of the sheet material as it is acted upon by the cutting rules.

Reference is now made to the drawings wherein.

Figure 1:
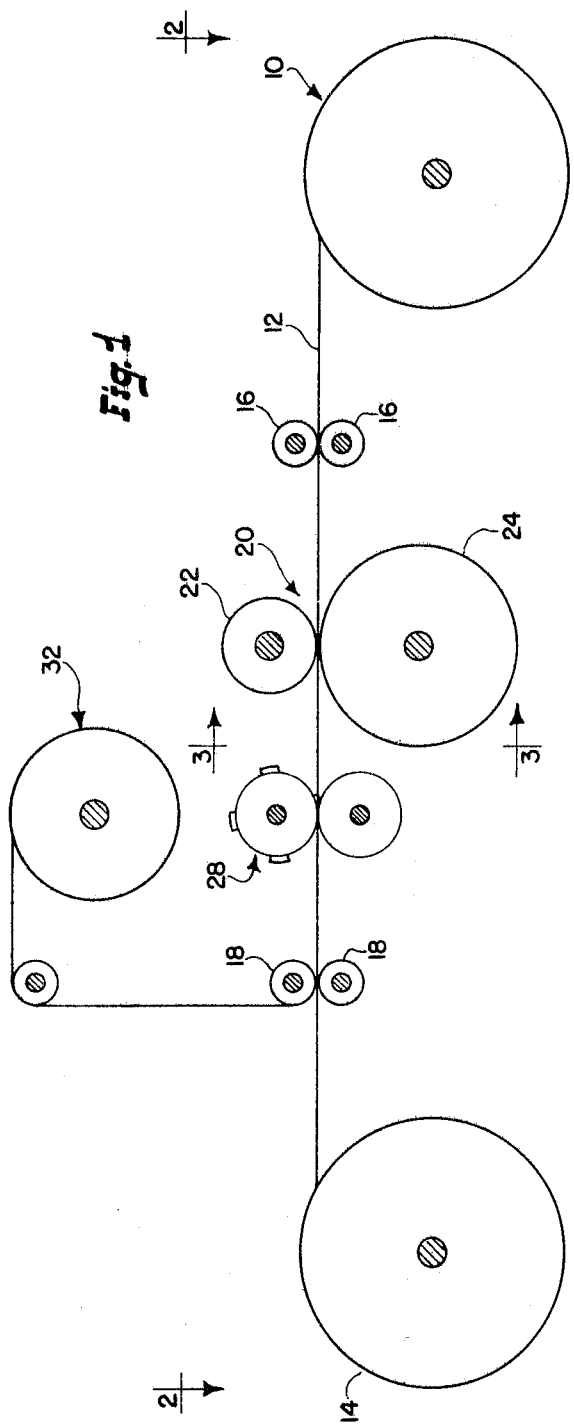
FIG. 1 is a top plan view of a rotary cutting apparatus constructed in accordance with and embodying the teachings of the present invention.

FIG. 3 is an enlarged fragmentary end elevational view of a cutting roll and a back-up roll, the cutting roll incorporating hold down means shown in full lines which are constructed in accordance with the teachings of the present invention in association with cutting rules protruding from the cutting roll, and the back-up roll having a partial representation of the hold down means in phantom lines indicating possible alternate use of the hold down means in conjunction with the back-up roll;

FIG. 4 is a top plan view of the cutting roll in an unwrapped or generally planar condition; and FIG. 5 is an enlarged fragmentary sectional view illustrating the manner in which the cutting rules and hold-down means act upon the sheet material during the cutting operation.

As previously indicated, the rotary cutting technique and apparatus of the present invention is designed particularly, though not exclusively, for use with strip plastic material such as polyethylene and the like. It is customary to wind a strip of plastic material into reel form as indicated at 10 in FIGS. 1–2 of the drawings. The reel of plastic strip material may be mounted on a suitable supporting shaft adjacent the strip in-feed side of the cutting apparatus, the forward end of the plastic strip material 12 being associated with a driven wind-up reel mechanism 14 adjacent the strip out-feed side of the cutting apparatus. Suitable feed rolls 16, 16 and 18, 18 on the in-feed and out-feed side respectively of the cutting apparatus are provided to continuously advance the plastic sheet material 12 from the unwind reel 10 to the wind-up reel 14. The above described elements are conventional in the art of cutting continuous strip material, thus further discussion or explanation thereof is unnecessary.

The rotary cutter device generally identified 20 includes a cutting roll 22 and a back-up roll or anvil 24 which are located on opposite sides of the plastic strip material 12, and which cooperate with one another to cut predetermined configurations from the plastic strip material. One such configuration, where preciseness of cut is important for both angular and linear dimensions, is a plastic sheet carrier of the type shown in U.S. Patent No. 2,874,835 which is assigned to the same assignee of the present invention. As disclosed in this aforementioned patent, the plastic sheet carrier comprises a sheet of substantially unsupported plastic material, polyethylene being one preferred example, having a plurality of substantially circular apertures therein which are somewhat smaller than the diameter of containers with which the carrier device is to be associated. The marginal portion surrounding each of the substantially circular apertures in the plastic sheet carrier is designed to stretch and deform when a container is inserted therein to form generally axially extending embracing portions which circumferentially and resiliently grip the containers beneath the peripheral enlargements or chimes thereof adjacent at least one of the ends of such containers.

A series of such plastic sheet carriers are interconnected to one another to form an elongated strip which is fed through an assembly machine such as disclosed, for example in U.S. Patent No. 3,032,944, which machine expands each of the container receiving apertures in respective plastic sheet carriers for assembling them to containers to form a multi-package. Assembly machines such as disclosed in this last mentioned patent are capable of applying plastic carrier devices to a double file procession of containers conveyed through the assembly machine at a rate of 1200 containers per minute. In view of the high speed capabilities of such assembly machines, it is important that each of the plastic carrier devices interconnected to one another in the elongated strip of carriers be precisely and accurately formed in accordance with prescribed standards. This has posed some difficulty insofar as utilizing rotary forming techniques in the production of the elongated strips of plastic sheet carriers.

The present invention will be described in connection with the production of a strip of elongated plastic sheet carrier devices of the type disclosed and claimed in U.S. Patent No. 2,874,835, it being recognized, however, that the present invention is not limited to the formation of such plastic sheet carrier devices.

Figure 2:
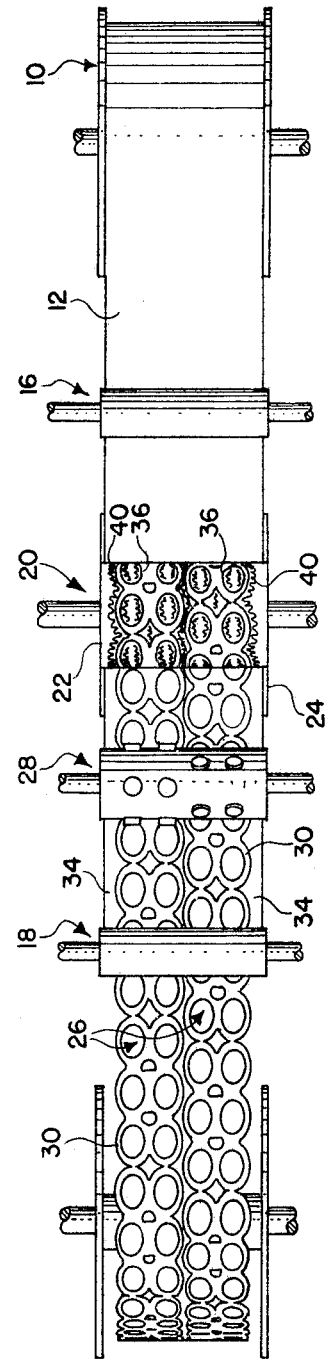
FIG. 2 is a side elevational view of the rotary cutting apparatus shown in FIG. 1.

Referring now to FIGS. 1–2 of the drawings, it will be seen that the cutting roll 22 cooperates with the back-up or anvil roll 24 in cutting a pair of elongated plastic carrier strips 26 from the plastic sheet material 12. Located downstream from the cutting roll and back-up roll 22, 24 respectively is a rotary ejector device 28 having mating male and female portions mounted on cylinder elements located on opposite sides of the plastic sheet material. The rotary ejector device 28 is designed to punch out inner marginal portions from the plastic sheet carrier devices forming the container receiving aperture designated 30 in the plastic sheet carrier devices. A scrap wind-up device 32 is provided for removing the scrap portions 34 of the plastic sheet material 12 which are not needed in the elongated strips 26 of the plastic sheet carrier devices. The scrap ejection and wind-up devices designated 28 and 32 respectively may be of any type or design to suit the particulars required.

The rotary cutter device 20 to which the present invention is directed includes the cutting roll 22 which is provided with cutting rules 36 which are configured to the shape of the plastic carrier devices. As best seen in FIGS. 3–4 of the drawings, there are a sufficient number of cutting rules 36 on the cutting roll 22 to cut two adjacent plastic carrier devices from the plastic sheet material 12 during each revolution of the cutting roll 22. The cutting rules 36 are arranged on the cutting roll 22 such that the adjacent elongated strips 26 of plastic carrier devices to be formed thereby are slightly offset from one another as will be clearly seen in the unwound or unwrapped view of the cutting roll 22 shown in FIG. 4 of the drawings.

To set apart the various types of cutting rule designs associated with the cutting roll 22 and to aid in highlighting the hold-down means to be described hereafter, the various cutting rules will be designated in the following manner: The cutting rules which cut the outer margin of the elongated strips of plastic sheet carriers will be designated 36a, the cutting rules which have a generally elliptical configuration and are designed to cut the container apertures 30 will be designated 36b, and the cutting rules which form the diamond-shaped openings and finger hole openings in the central portions of the carrier devices will be collectively designated 36c.

The cutting rules 36 are rigidly clamped or affixed to the cutting roll 22 by conventional techniques in such a manner that the outer or cutting edge 38 of the cutting rolls as best seen in FIG. 5 of the drawings protrudes beyond the outer cylindrical surface of the cutting roll by an amount equal to the thickness of the plastic sheet material 12 to be cut.

In addition to the cutting roll 22, the rotary cutter device 20 includes the back-up or anvil roll 24 which has a smooth exterior surface, and which may be made from any suitable material conventionally used in rotary cutter devices. The diameter of the back-up or anvil roll 24 is greater than the cutting roll 22 such that the cutting rules 36 associated with the cutting roll 22 will engage different areas of the anvil roll 24 during the cutting operation.

As an important feature of the present invention, there is provided hold-down means associated with either the cutting roll 22 or the back-up or anvil roll 24 which is designed to impress a score pattern in the plastic sheet material 12 of a type which restricts transverse and longitudinal movement of the plastic sheet material 12 as it is cut into the desired configuration by the cooperation between the cutting roll 22 and the back-up or anvil roll 24. As best illustrated in FIGS. 3–5 of the drawings, the hold-down means there depicted comprises a series of undulated or wave-like forms 40 associated with the cutting roll 22 and conforming to the configuration of the cutting rules 36. The undulated or wave-like forms of the hold-down means are designed to engage the plastic sheet material 12 in areas outside of and in between the elongated strips 26 generally defined by the scrap portions 34, areas of the plastic sheet material 12 which are located within the confines of the container receiving apertures 30, and also central portions of the carrier strips 26 defined by the diamond-shaped openings in the central or medial portions of the strips 26. For ease of discussion, the undulated or wave-like forms 40 engaging the scrap portions 34 will be designated 40a, the undulated or wave-like forms engaging the portions confined within the container receiving aperture cutting rules 36b will be designated 40b, and the undulated or wave-like forms engaging the plastic material within the diamond-shaped opening and finger hole cutting rules 36c will be designated 40c.

From the arrangement and location of the undulated or wavelike forms 40a, 40b and 40c as best seen in FIGS. 3–5 of the drawings, it will be understood that the undulated or wave-like forms 40a through 40c not only conform to the configuration of the cutting rolls 36, but are arranged on opposite sides of a pair of cooperating cutting roll 36 which will cut, for example, the outer marginal portions of the carrier strip. Thus, the undulated or wave-like hold-down means 40a will cooperate with the outermost undulated or wave-like hold-down means of the pair of hold-down means 40b which are located within the container receiving aperture cutting rule portions 36b, while the innermost undulated or wave-like hold-down means in the pair of hold-down means 40b located in each container receiving aperture cutting rule 36b will cooperate with a laterally adjacent innermost undulated or wave-like hold-down means 40b. The innermost hold-down means in the pairs of hold-down means 40b surrounding each diamond-shaped opening cutting rule 36c will cooperate with the hold-down 40c which is located within the confines of the diamond-shaped cutting rule 36c. Additionally, it will be noted that the crest and valley portions of the cooperating hold-down means mentioned above are generally in transverse non-aligned relationship with one another.

The hold-down means 40a, 40b and 40c are thus configured, arranged and located with respect to one another to impress a scoring pattern in the plastic sheet material 12 which restricts transverse and longitudinal movement of the plastic sheet material 12 during the cutting thereof by the cooperation of the cutting roll 22 and the back-up or anvil roll 24. Specifically, the hold-down means 40a, 40b and 40c provide preciseness or accuracy of the ultimately cut product in both angular and linear dimensions due to the following features:

(1) The hold-down means 40 generally conforms to the shape or configuration of the cutting rules 36 throughout their length or shape. As a result, the hold-down means will aid in controlling the movement of the plastic sheet material notwithstanding the many unusual angular or linear definitions that can be provided in ultimately formed products.

(2) The hold-down means 40 cooperate with one another on opposite sides of each longitudinally extending (and sometimes curved) portions of the ultimately formed product. In this way, generally opposed and cooperating hold-down means operate in conjunction with one another to restrict undesirable transverse or longitudinal movement of the plastic sheet material.

(3) The cooperating hold-down means 40 mentioned in (2) above have the valleys and crests thereof in generally transverse non-aligned relationship. This will provide an overlapping in the valleys and crests of cooperating hold-down means to assure the formation of a transverse and longitudinal scoring pattern at any point in the cutting operation.

After the cutting operation, the areas of the plastic sheet material 12 which are impressed with the scoring pattern of the hold-down means 40a, 40b and 40c will be removed or separated from the elongated strips 26 of plastic sheet carriers by the knockout or rotary ejector device 28 and the scrap wind-up device 32.

From the foregoing, it will be appreciated that the present invention provides an improved rotary cutting apparatus and technique which facilitates the cutting of plastic sheet material with the desired speed and efficiency, while at the same time providing preciseness or accuracy in the ultimately cut product in both angular and linear dimensions.

It is to be understood that the specific example of the invention herein shown and described is for illustrative purposes only. Various changes in structure will no doubt occur to those skilled in the art, and will be understood as forming a part of this invention insofar as they fall within the spirit and scope of the intended claims.

What is claimed is:

1. A rotary cutter for sheet material having a low coefficient of friction, comprising a cutting roll and a back-up roll, said cutting roll having cutting rules protruding therefrom which are arranged in a predetermined configuration for cooperation with said back-up roll in cutting the sheet material in conformity with the predetermined configuration of said cutting rules, and an undulated hold-down means associated with one of said cutting roll and back-up roll for impressing a score pattern in said sheet material which restricts transverse and longitudinal movement of said sheet material as it is acted upon by said cutting rules, said cutting rules being arranged to cut separate, discrete portions in the ultimately formed product, and said undulated hold-down means being located on opposite sides of each separate, discrete portion in the ultimately formed product.

2. The rotary cutter as defined in claim 1 wherein said hold-down means is mounted on said cutting roll.

3. The rotary cutter as defined in claim 1 wherein said hold-down means is mounted on said back-up roll.

4. The rotary cutter as defined in claim 1 wherein said hold-down means impresses both longitudinal and transverse score lines in said sheet material relative to the direction of its movement.

5. The rotary cutter as defined in claim 1 wherein the undulated hold-down means located on opposite sides of each separate, discrete portion in the ultimately formed product have corresponding crest and valley portions thereof in general transverse non-alignment with one another.

6. The rotary cutter as defined in claim 5 wherein said undulated hold-down means generally conform to the shape of said cutting rules.

7. The rotary cutter as defined in claim 1 wherein said cutting rules are designed to cut at least one apertured carrier device in said sheet material, and said hold-down means is arranged to score sheet material portions adjacent the inner and outer margins of the apertured carrier device.

8. The rotary cutter as defined in claim 1 wherein the cutting rules have a slightly distorted elongated configuration relative to the final shape of the articles cut from the sheet material.

References Cited

UNITED STATES PATENTS

| | | | |
|---|---|---|---|
| 803,972 | 11/1905 | Bechman | 83—343 X |
| 1,518,260 | 12/1924 | Hislop | 83—678 X |
| 1,967,726 | 7/1934 | Sherman | 83—347 X |
| 3,244,335 | 5/1966 | Downie | 83—925 X |

ANDREW R. JUHASZ, Primary Examiner

U.S. Cl. X.R.

83—346, 374, 659; 18—1; 264—153